United States Patent
Ma et al.

(10) Patent No.: US 8,111,823 B2
(45) Date of Patent: Feb. 7, 2012

(54) METHOD, DEVICE AND SYSTEM FOR REALIZING UNIVERSAL PERSONAL NUMBER RING BACK TONE SERVICE

(75) Inventors: Qifeng Ma, Shenzhen (CN); Jianfeng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 347 days.

(21) Appl. No.: 12/240,303

(22) Filed: Sep. 29, 2008

(65) Prior Publication Data

US 2009/0028301 A1 Jan. 29, 2009

Related U.S. Application Data

(63) Continuation of application No. PCT/CN2007/000167, filed on Jan. 17, 2007.

(30) Foreign Application Priority Data

Apr. 12, 2006 (CN) .......................... 2006 1 0060253

(51) Int. Cl.
*H04M 3/42* (2006.01)
(52) U.S. Cl. .......... 379/211.02; 379/207.16; 379/212.01
(58) Field of Classification Search ............. 379/207.16, 379/211.03, 211.02, 212.01
See application file for complete search history.

(56) References Cited

U.S. PATENT DOCUMENTS

| | | | | |
|---|---|---|---|---|
| 6,058,415 A * | 5/2000 | Polcyn | ......................... | 709/200 |
| 6,356,756 B1 * | 3/2002 | Koster | ......................... | 455/445 |
| 6,885,742 B1 * | 4/2005 | Smith | ...................... | 379/211.01 |
| 7,340,049 B2 * | 3/2008 | Batni et al. | ............... | 379/221.08 |
| 7,493,125 B2 * | 2/2009 | Nagesh et al. | ............. | 455/456.1 |
| 7,515,898 B2 * | 4/2009 | Chin et al. | ..................... | 455/401 |
| 7,613,287 B1 * | 11/2009 | Stifelman et al. | ........ | 379/215.01 |
| 7,664,236 B2 * | 2/2010 | Radziewicz et al. | ....... | 379/88.25 |
| 7,792,264 B2 * | 9/2010 | Pfleging et al. | .......... | 379/207.16 |
| 7,889,853 B2 * | 2/2011 | Sutcliffe | .................. | 379/207.16 |
| 2001/0038691 A1 * | 11/2001 | Lautenschlager et al. | ......................... | 379/221.03 |
| 2004/0081304 A1 | 4/2004 | Lee | | |
| 2004/0174983 A1 | 9/2004 | Olschwang et al. | | |
| 2007/0189474 A1 * | 8/2007 | Cai | ......................... | 379/142.01 |

FOREIGN PATENT DOCUMENTS

CN 1497906 A 5/2004

(Continued)

OTHER PUBLICATIONS

European Search Report (Mar. 22, 2010).

(Continued)

*Primary Examiner* — Simon Sing
(74) *Attorney, Agent, or Firm* — Leydig, Voit & Mayer, Ltd.

(57) ABSTRACT

A method for realizing the universal personal number ring back tone service comprises: determining the ring back tone played according to the called information, and determining the media resources for playing the ring back tone according to the calling information, the media resources information and the said ring back tone information; the said media resource plays the said ring back tone. The present invention also discloses a device and a system for realizing the universal personal number ring back tone service. On the basis of the present invention, UPT users are supported to assign the different ring back tone for each destination number, respectively, and the ring back tone information of each media resource is dynamically updated in accordance with the using situation of the ring back tone, therefore realizing that the UPT ring back tone service utilizes the network resources effectively.

11 Claims, 4 Drawing Sheets

FOREIGN PATENT DOCUMENTS

| | | |
|---|---|---|
| CN | 1543231 A | 11/2004 |
| CN | 1889604 A | 1/2007 |
| WO | WO 2004/093422 A1 | 10/2004 |
| WO | WO 2005/043926 A | 5/2005 |
| WO | WO 2005/112492 A1 | 11/2005 |

OTHER PUBLICATIONS

European Patent Office, Examination Report in European Patent Application No. 07702099.8 (Jun. 1, 2010).

Written Opinion of the International Searching Authority in corresponding PCT Application No. PCT/CN2007/000167 (May 17, 2007).

International Search Report in corresponding PCT Application No. PCT/CN2007/000167 (May 17, 2007).

"TD 168 (WP 3/13)—New Draft Recommendation Y.ngn-upt," Telecommunication Standardization Sector Study Period 2005-2008, Jan. 16-27, 2006, International Telecommunication Union, Geneva, Switzerland.

* cited by examiner

METHOD, DEVICE AND SYSTEM FOR REALIZING UNIVERSAL PERSONAL NUMBER RING BACK TONE SERVICE

CROSS-REFERENCE TO RELATED APPLICATION

This application is a continuation of International Patent Application No. PCT/CN2007/000167, filed Jan. 17, 2007, which claims priority to Chinese Patent Application No. 200610060253.3, filed Apr. 12, 2006, both of which are hereby incorporated by reference in their entirety.

FIELD OF THE INVENTION

The present invention relates to the field of internet and of radio communication, and in particular, to a method, device and system for implementing a Universal Personal Telecommunication (UPT) ring back tone service.

BACKGROUND OF THE INVENTION

UPT is an abbreviation of Universal Personal Telecommunication. When a person has a UPT number and another subscriber dials the UPT number, the incoming call may be connected to a local fixed telephone, an automatic pager, a mobile phone, a voice mailbox that can be directly dialed in, etc. A UPT application server may further set various forward numbers (Forwarding on Busy, Forwarding on Schedule, etc.) via a management interface. A subscriber may register an office telephone number and a mobile phone number according to his/her work and rest practice so that a call may be forwarded to an office telephone during working time or to a mobile phone at other time.

On the existing telecommunication market, integrated solutions to the color ring back tone service have been developed for the Global System for Mobile communications (GSM) network, the Code Division Multiple Access (CDMA) network and the fixed telephone network, respectively. Such solutions may be classified into intelligent network solutions, end office solutions, and so on. In all of these solutions, any ring back tone is provided from the home network of the subscriber, thus causing some inflexibility. In addition, the UPT application server and the ring back tone service are deployed separately and thus independent of each other. In the existing ring back tone services, usually a media resource server of the home network of the called subscriber can be previously configured to provide a ring back tone service for the subscriber, and it is not possible to dynamically select an optimal media resource server for a current call according to the information on the caller and the called as well as the ring back tone per se, resulting in the waste of the network resources to some extent. On the other hand, the subscriber cannot configure ring back tone information flexibly for different destination numbers corresponding to his/her UPT.

SUMMARY OF THE INVENTION

A problem to be solved by embodiments of the invention is to provide a method, device and system for implementing a Universal Personal Telecommunication ring back tone service, thereby enabling flexible configuration of a ring back tone for a subscriber.

An embodiment of the present invention provides a method for implementing a Universal Personal Telecommunication ring back tone service, including: determining a ring back tone to be played according to called information, determining a media resource for playing the ring back tone according to caller information, media resource information and ring back tone information, and playing the ring back tone by the media resource.

Another embodiment of the present invention provides a device for implementing a Universal Personal Telecommunication ring back tone service, including: a media resource selection unit for determining a media resource for playing a ring back tone according to caller information, media resource information and ring back tone information, the ring back tone being determined as a ring back tone to be played according to called information, and a ring back tone control unit for instructing the media resource to play the ring back tone.

Another embodiment of the present invention provides a system for implementing a Universal Personal Telecommunication ring back tone service, including an application server and media resources, wherein the application server includes: a media resource selection unit for determining a media resource for playing a ring back tone according to caller information, media resource information and ring back tone information, the ring back tone being determined as a ring back tone to be played according to called information, and a ring back tone control unit for instructing the media resource to play the ring back tone.

The embodiments of the present invention provide a unified ring back tone resource management control platform, which enables to implement a unified management control on ring back tones within a whole network in combination with a Universal Personal Telecommunication application server, and to select an optimal media resource for playing a ring back tone for a caller according to a caller number and called number of a call and information on the ring back tone per se, thereby enabling optimization of the network resources.

DETAILED DESCRIPTION OF THE EMBODIMENTS

The embodiments of the invention will be described with reference to the accompanying drawings for understanding and implementation of the invention by those skilled in the art.

Figure 1:
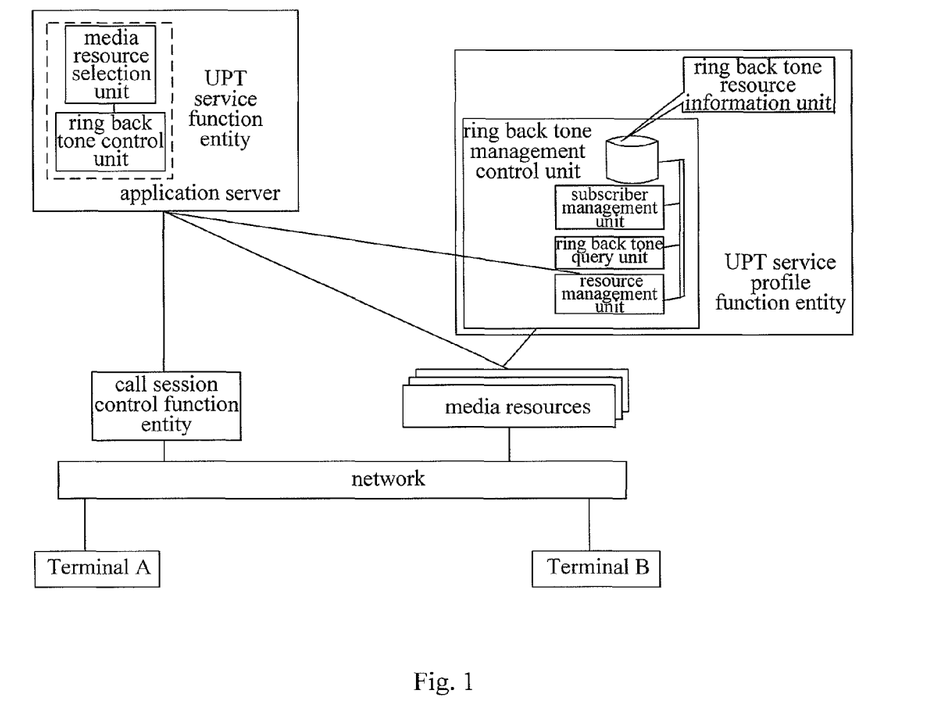
FIG. 1 is a block diagram illustrating a system, according to an embodiment of the invention.

The embodiments of the invention provide a system and method for providing a UPT ring back tone service using an application signaling protocol (Session Initiation Protocol, SIP) based on the architecture of the Next Generation Network (NGN). FIG. 1 shows the structure of a system for implementing a UPT ring back tone service, according to an embodiment of the invention. The system includes: a calling terminal, a called terminal, a call session control function entity, an application server, a service profile function entity and media resources. The application server is adapted to route a call to a specific destination number according to registered UPT information in response to a triggering request message received from the call session control function entity, and return a response message to the call session control function entity. The UPT service profile function entity is adapted to store UPT service profile information and ring back tone resource information, perform a query in response to a request message received from the application server, and return a response message to the application server. The call session control function entity is adapted to trigger a UPT service in response to a request message from a terminal. The media resources are adapted to play a ring back tone for the caller, according to an instruction from the application server.

The system shown in FIG. 1 also includes a device dedicated to implementing a UPT ring back tone service. The device includes two basic units: one is a media resource selection unit for determining a ring back tone to be played according to the called number and determining a media resource for playing the determined ring back tone according to caller information, media resource information and the ring back tone; the other is a ring back tone control unit for issuing a playing instruction to the determined media resource, and instructing the media resource to play the ring back tone.

The determination of the ring back tone is implemented by the media resource selection unit and the UPT service profile function entity cooperatively. Based on the device described above, a first embodiment of the device for implementing a UPT ring back tone service according to the invention further includes a ring back tone query unit for querying ring back tone and media resource information in response to a query request and configuring the media resource for playing the ring back tone. Based on the first embodiment of the device, a second embodiment of the device further includes a media resource management unit for detecting or receiving the ring back tone information in the media resource, updating information on correspondence between ring back tones and media resources, and providing queried information to the ring back tone query unit.

Based on the second embodiment of the device, a third embodiment of the device further includes a ring back tone resource information unit for storing ring back tone information corresponding to a specific destination number of a UPT number, and providing queried information to the ring back tone query unit. Based on the third embodiment of the device, a fourth embodiment of the device further includes a subscriber management unit for providing management maintenance for a subscriber, such as configuring or disabling a ring back tone for a specific number of the subscriber.

Based on the device for implementing a UPT ring back tone service, the embodiments of the invention further provide a system for implementing a UPT ring back tone service. A first embodiment of the system includes an application server, a UPT service profile function entity, a call session control function entity and media resources. The application server includes a media resource selection unit for determining a ring back tone to be played and determining a media resource for playing the ring back tone according to caller information, a called number and media resource information. The UPT service function entity includes a ring back tone control unit for issuing a playing instruction to the determined media resource, instructing the media resource to play the ring back tone.

Based on the first embodiment of the system, in a second embodiment of the system, the UPT service profile function entity further includes a resource management unit for detecting or receiving the ring back tone information in the media resource, updating the information on correspondence between ring back tones and media resources, and providing queried information to the ring back tone query unit. Based on the second embodiment of the system, a third embodiment of the system further includes a ring back tone resource information unit for storing ring back tone information corresponding to a specific destination number of a UPT number, and providing queried information to the ring back tone query unit. Based on the third embodiment of the system, a fourth embodiment of the system further includes a subscriber management unit for providing management maintenance for a subscriber, such as configuring or disabling a ring back tone for a specific destination number of the subscriber.

Hereinafter the fourth embodiment of the device for implementing a UPT ring back tone service will be further described with reference to FIG. 1. Specifically, the application server includes a UPT service function entity as well as the media resource selection unit and the ring back tone control unit, i.e. the media resource selection unit and the ring back tone control unit of the device for implementing a UPT ring back tone service are arranged in the application server. The media resource selection unit is adapted to send a query request message to a ring back tone management control unit, and determine a media resource for playing a ring back tone according to the result of the query, and the ring back tone control unit is adapted to issue an instruction to the media resource. The media resource is adapted to play a ring back tone according to the instruction from the ring back tone control unit. The UPT service profile function entity includes the ring back tone management control unit for storing and managing the media resource and ring back tone information, maintaining the ring back tone information available for the UPT ring back tone service, and selecting a ring back tone to be played and a media resource for playing the ring back tone in response to the query request sent from the media resource selection unit.

More specifically, the ring back tone management control unit includes the ring back tone resource information unit, the ring back tone query unit, the resource management unit and the subscriber management unit. The ring back tone resource information unit is adapted to store ring back tone information and media resource information for the UPT number. The ring back tone query unit is adapted to configure an optimal media resource for playing the ring back tone according to caller information and the media resource information. The resource management unit is adapted to detect or receive the ring back tone information in the media resource, and update the ring back tone information and the media resource information. The subscriber management unit is adapted to provide management maintenance for a subscriber, such as configuring or disabling a ring back tone for a specific number of the subscriber.

When a UPT number of a subscriber is called, the network triggers a corresponding UPT service of the application server. The UPT service function entity of the application server routes the call to a specific destination number according to the information registered by the subscriber. During the ringing, the media resource selection unit selects a specific ring back tone to be played for the call and a media resource for playing the ring back tone by querying the ring back tone query unit in the ring back tone management control unit of the UPT service profile function entity. The ring back tone management control unit may be a part of the entire UPT service profile function entity, or may be deployed separately. The main function of the ring back tone management control unit is to store the media resource and ring back tone information, and maintain the ring back tone resource information available to the UPT service, including a globally unique identification of the ring back tone and other relevant information, such as location of a media resource and what ring back tone is supported by a media resource. The ring back tone management control unit selects a media resource for the current call according to caller information and destination number of the call, the ring back tone subscribed to by the subscriber for the destination number, etc., and the media resource thus plays the ring back tone subscribed to by the called for the caller.

By way of example, in the case that the UPT subscriber as the called has registered different ring back tones for different destination numbers, if the current call is to be routed to a specific fixed telephone number, the ring back tone to be played for the call should be a ring back tone configured for the fixed telephone number by the UPT subscriber. In selection of a specific media resource for playing the ring back tone, reference should be made to the caller information. The criteria for the selection may be a distance to the caller, a load on the system, etc. The media resource selection unit informs, according to the queried media resource information, the UPT application server to instruct the corresponding media resource to play the ring back tone for the caller. When the called answers, the application server instructs the media resource to suspend playing the ring back tone and connects the caller and the caller for a talk. The solutions of the invention will be explained in detail below in view of the embodiments.

Figure 4:
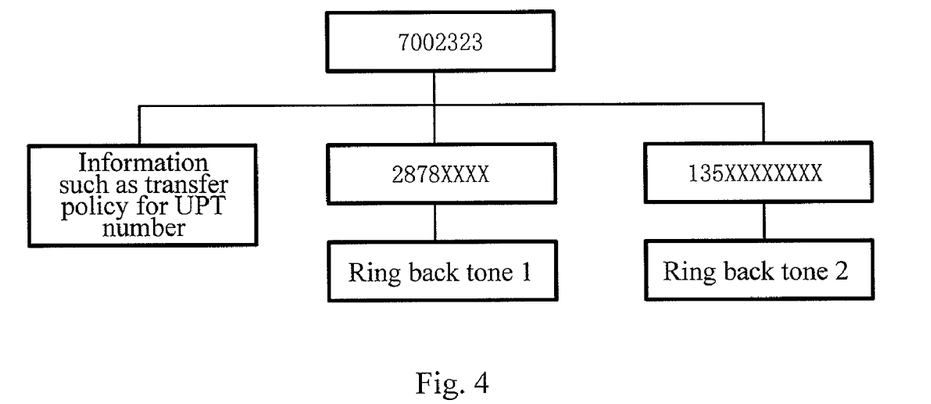
FIG. 4 is a schematic diagram illustrating storage of the specific destination numbers corresponding to a subscriber's UPT number as well as the ring back tones information, according to the embodiment illustrated in FIG. 1.

Consider such a case that subscriber 1 has subscribed to a UPT service and the UPT number is 7002323, and subscriber 1 has configured, through a management interface of the UPT application server, different forward numbers, i.e. an office telephone number and a mobile phone number, according to his/her work and rest practice so that a call may be forwarded to the office telephone 2878XXXX during working time or to the mobile phone number 135XXXXXXXX at other time. As shown in FIG. 4, in addition to storing information on the UPT number, the UPT application server of subscriber 1 may also register ring back tone 1 and ring back tone 2 for calling of the two numbers 2878XXXX and 135XXXXXXXX, respectively, through a subscriber management unit provided by the service. The subscriber configuration information stored in a service database is as shown in Table 1. The subscriber may add configuration information such as information on a default ring back tone as required in practice, and update the configuration information through a subscriber management interface.

TABLE 1

| UPT Number | Destination Number | Ring Back Tone Information |
|---|---|---|
| 7002323 | 2878XXXX | Code of Ring Back Tone 1 |
|  | 135XXXXXXXX | Code of Ring Back Tone 2 |

To implement an optimized management of the media resources and avoid waste of the network resources, the ring back tone information may be coded and managed in a unified way as required, and a relevant information table showing correspondence between ring back tones and media resources may be established as Table 2. The media resource information may be added in the UPT service profile function entity and updated and maintained by the resource management unit. The media resource information as shown in Table 3 is stored in the resource management unit. The resource management unit may detect or receive the ring back tone information reported by a media resource, and update the contents of Tables 2 and 3 dynamically. The ring back tone query unit is mainly adapted to provide a query interface for the service and performs a relevant query. For example, when the UPT application server sends a query request containing caller information, the UPT number, the specific destination number of the current call, etc., the ring back tone query unit searches for a media resource having a smallest distance to the caller and being well conditioned in view of the load, according to the caller information, e.g. the media resource information as shown in Table 3, and searches for a specific ring back tone for the current call according to the information in Table 1 based on the UPT number and the specific destination number of the current call. The ring back tone query unit checks the two searching results by comparing them with the information in Table 2. If there is an agreement, the media resource address and the ring back tone information are fed back to the UPT application server, and the application server instructs the media resource to play the ring back tone for the caller. A disagreement indicates that the media resource having a smallest distance to the caller does not support the ring back tone configured by the UPT subscriber. The ring back tone query unit searches for a suboptimal media resource according the above method and feeds back the relevant information to the service. The ring back tone query unit also sends a relevant notification to the resource management unit, and the resource management unit allocates the ring back tone to the media resource, which will be used as an optimal media resource for providing a ring back tone service for a caller of a similar future call, in place of another media resource to which the ring back tone is allocated previously, through relevant approaches according to the condition of utilization of the ring back tone and updates the relevant information in Table 2. The above method is just one of the methods of organizing information for the same purpose. In addition, to implement other functions, such as switching of ring back tones and configuration of a default ring back tone, relevant attributes may be added to the above information.

TABLE 2

| Ring Back Tone Information | Condition of Utilization | Supporting Media Resource |
|---|---|---|
| Code of Ring Back Tone | Utilization Ratio | Media Resource Address 1 Media Resource Address 2 |

TABLE 3

| Media Resource | Media Resource Information |
|---|---|
| Media Resource Address | Location Information Network Information Load Information |

In the present embodiment, there are, for example, two media resources both providing ring back tone resources for the network, and the media resource information is as shown in Table 4. If there are 10 levels of load information, the relevant information corresponding to the ring back tones stored in the service database is as shown in Table 5, and the load information will be updated with an actual load by the resource management unit according to an actual condition.

TABLE 4

| Media Resource | Media Resource Information |
| --- | --- |
| Media Resource 1 | Located in Shenzhen<br>Network 1<br>Load Information |
| Media Resource 2 | Located in Beijing<br>Network 2<br>Load Information |

TABLE 5

| Ring Back Tone Information | Condition of Utilization | Supporting Media Resource |
| --- | --- | --- |
| Ring Back Tone 1 | 8 | Media Resource 1<br>Media Resource 2 |
| Ring Back Tone 2 | 6 | Media Resource 2 |

Figure 2:
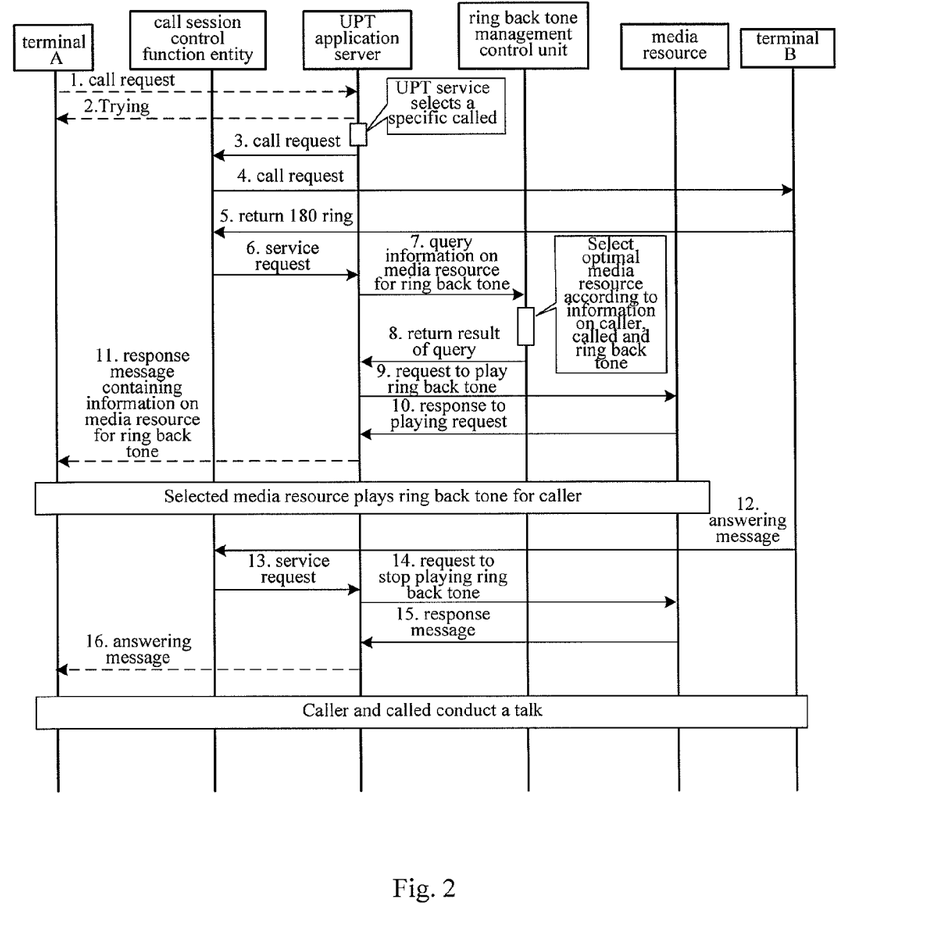
FIG. 2 is a flow chart illustrating the call signaling used in the embodiment illustrated in FIG. 1.

A call flow of the UPT service will be described below with reference to FIG. 2 in connection with an example in which a schoolmate of subscriber 1 in Beijing calls subscriber 1 by dialing the UPT number of subscriber 1 at a non-working time, with the caller being named subscriber A.

1. Subscriber A calls subscriber 1 through the UPT number of subscriber 1.

2. The UPT application server selects a specific called number, here the mobile phone number 135XXXXXXXX of subscriber 1, according to the information registered by subscriber 1 and sends a service request message to the call session control function entity.

3. In response to the received service request message, the call session control function entity calls the terminal whose number is 135XXXXXXXX by sending a call request to the terminal whose number is 135XXXXXXXX.

4. The call session control function entity determines whether the terminal whose number is 135XXXXXXXX is idle according to whether the terminal whose number is 135XXXXXXXX returns a response ring message; and if the terminal is idle, step 5 is performed.

5. The call session control function entity sends a service triggering message to the application server.

6. The application server sends a query request message to the ring back tone management control unit; and the ring back tone management control unit determines an optimal media resource according to the caller and called information as well as the loads on the media resources, and returns the result of the query to the application server.

The media resource selection unit in the application server sends to the ring back tone management control unit the information relevant to the current call, such as the caller number, the called number and the information on the ring back tone configured by the called, to select an optimal media resource for playing the ring back tone. A flow of selecting a media resource for playing a ring back tone is described below with reference to FIG. 3. The ring back tone query unit determines that subscriber A is located in Beijing from the caller number, checks the stored media resource information and selects media resource 2 located in Beijing as an optimal media resource for the current call. The ring back tone query unit further determines that the ring back tone to be played for the call is ring back tone 2 from the number 135XXXXXXXX. After confirming that media resource 2 located in Beijing supports playing ring back tone 2, the ring back tone query unit returns the information on media resource 2 and ring back tone 2 to the application server, and sends a relevant notification to the resource management unit. The resource management unit updates the utilization ratio of ring back tone 2. The resource management unit may also be adapted to allocate the ring back tone to the media resource from another media resource to which the ring back tone is allocated previously, through relevant approaches, and update the relevant information in Table 2. Upon receiving the information on ring back tone 2 and the address of media resource 2, the application server instructs media resource 2 to play the ring back tone. When subscriber 1 answers through the mobile phone whose number is 135XXXXXXXX, the service system instructs the media resource to suspend playing the ring back tone and connects the caller and called for a talk.

Figure 3:
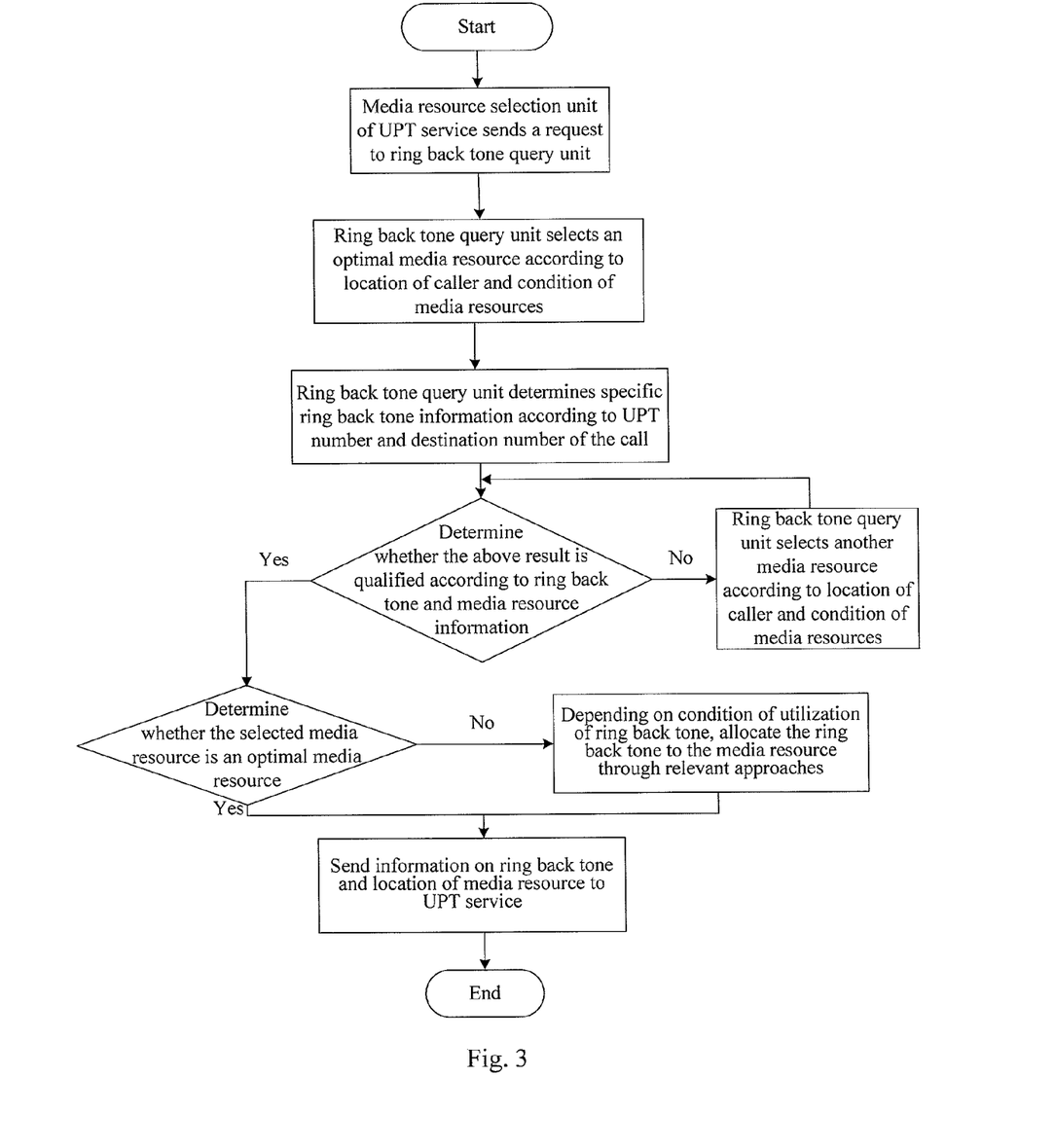
FIG. 3 is a flow chart illustrating selection of a media resource for playing a ring back tone in a method, according an embodiment of the invention.

To implement this step, it needs to store in the ring back tone management control unit the media resource information, such as location, what ring back tone is supported, and a load on the system. The ring back tone may be identified uniquely within the whole network so that a media resource supporting a certain ring back tone may be determined accurately by searching for the media resource corresponding to the ring back tone. A specific ring back tone is determined by searching for the ring back tone configured by the subscriber for the specific called number of the current call. In selection of a media resource for playing the ring back tone, reference should be made to the caller information to select the media resource having a smallest distance to the caller for playing the ring back tone for the caller. If the selected optimal media resource does not support the ring back tone, the resource management unit selects a suboptimal media resource until a media resource qualified for serving the caller is found. For optimization and combination of the ring back tone resources within the network, when an optimal media resource does not support a ring back tone, the resource management unit allocates initiatively the ring back tone to the optimal media resource from another media resource that supports the ring back tone, and updates the information of the ring back tone supported by the optimal media resource stored in the resource management unit, so that the optimal media resource may provide this ring back tone service for a similar future call requiring a ring back tone.

7. The application server instructs the corresponding media resource to play the ring back tone according to the received result.

8. The media resource returns a response to the application server.

9. The application server returns to the call session control function entity a response message containing the media resource information, such as the location of the media resource, the port and the protocol supported by the media stream.

10. The call session control function entity returns the media resource information to the terminal of subscriber A as the caller, and the media resource begins to play the ring back tone configured by the called for the caller.

11. After answering the call, the terminal of the called subscriber sends an answering message to the call session control function entity.

12. The call session control function entity notifies the application server that the caller has answered.

13. Upon receiving the caller answering message, the application server requests the media resource to stop playing the ring back tone.

14. In response to the request of the application server, the media resource stops playing the ring back tone, and returns a response message to the application server.

15. The application server sends an answering message to the caller, and the caller and the called conduct a talk.

The embodiments of the invention mainly provides a unified ring back tone resource management control platform, which enables to implement a unified management control on ring back tones within a whole network in combination with a UPT system, and to select an optimal media resource for playing a ring back tone for a caller according to a caller number and called number of a call and information on the ring back tone per se, thereby enabling optimization of the network resources.

The present invention has been described and illustrated by the embodiments of the present invention and the drawings. It shall be recognized by those skilled in the art that those embodiments and drawings are merely illustrative and not restrictive, that the present invention shall not be limited thereto, and that various modifications and variations can be made thereto in light of the descriptions and the drawings without departing from the spirit and scope of the present invention as defined by the accompanying claims.

What is claimed is:

1. A method for implementing a Universal Personal Telecommunication (UPT) ring back tone service, including:
   receiving a call through a UPT number from a caller; wherein the call is routed to a destination number of the UPT number according to a routing rule, and there are at least two destination numbers associated with the UPT number;
   determining a ring back tone to be played according to a UPT setting by a called party; wherein the setting by the called party includes said routing rule and said at least two destination numbers, wherein each of the destination numbers has a corresponding ring back tone;
   determining a media resource for playing the ring back tone according to caller information and media resource information; and
   instructing the media resource to play the ring back tone for the caller.

2. The method according to claim 1, wherein
   an optimal media resource is selected according to the caller information and the media resource information;
   an information table is established for showing correspondence between ring back tones and media resources supporting playing of the ring back tones, the information table at least including the caller information and the media resource information; and
   the optimal media resource for playing the ring back tone is determined according to the information table.

3. The method according to claim 1, wherein the caller information at least includes caller location information; and the media resource information at least comprises media resource location information or media resource load information.

4. A device for implementing a Universal Personal Telecommunication (UPT) ring back tone service, including:
   a media resource selection unit, capable of determining a media resource for playing a ring back tone according to caller information and media resource information when receiving a call through a UPT number from a caller; wherein the call is routed to a destination number of the UPT number according to a routing rule, and there are at least two destination numbers associated with the UPT number;
   wherein the ring back tone is determined as a ring back tone to be played according to a UPT setting by a called party, wherein the setting by the called party includes said routing rule and said at least two destination numbers, wherein each of the destination numbers has a corresponding ring back tone; and
   a ring back tone control unit, capable of instructing the media resource to play the ring back tone.

5. The device according to claim 4, further including:
   a ring back tone query unit, capable of querying the media resource information in response to a query request sent from the media resource selection unit and configuring the media resource for playing the ring back tone.

6. The device according to claim 5, further including:
   a resource management unit capable of detecting or receiving the ring back tone information in the media resource, updating the ring back tone information and the corresponding media resource information, and providing queried information to the ring back tone query unit.

7. The device according to claim 6, further including:
   a ring back tone resource information unit capable of storing ring back tone information corresponding to a specific destination number of a Universal Personal Telecommunication number, and providing queried information to the ring back tone query unit.

8. A system for implementing a Universal Personal Telecommunication (UPT) ring back tone service, comprising an application server and media resources, wherein the application server including:
   a media resource selection unit, capable of determining a media resource for playing a ring back tone according to caller information and media resource information when receiving a call through a UPT number from a caller;
   wherein the call is routed to a destination number of the UPT number according to a routing rule, and there are at least two destination numbers associated with the UPT number;
   wherein the ring back tone is determined as a ring back tone to be played according to a UPT setting by the called party, wherein the setting by the called party includes said routing rule and said at least two destination numbers, wherein each of the destination numbers has a corresponding ring back tone; and
   a ring back tone control unit, capable of instructing the media resource to play the ring back tone.

9. The system according to claim 8, further including a Universal Personal Telecommunication service profile function entity, wherein the Universal Personal Telecommunication service profile function entity including a ring back tone query unit capable of querying the media resource information in response to a query request sent from the media resource selection unit and configuring the media resource for playing the ring back tone.

10. The system according to claim 9, wherein the Universal Personal Telecommunication service profile function entity further includes a resource management unit, capable of detecting or receiving the ring back tone information in the media resource, updating the ring back tone information and the corresponding media resource information, and providing queried information to the ring back tone query unit.

11. The system according to claim 10, wherein the Universal Personal Telecommunication service profile function entity further includes a ring back tone resource information unit, capable of storing ring back tone information corresponding to a specific destination number of a Universal Personal Telecommunication number, and providing queried information to the ring back tone query unit.

* * * * *